C. S. NICHOLS.
BAND CUTTER AND FEEDER FOR THRESHING MACHINES.
APPLICATION FILED JULY 2, 1917.

1,260,014.

Patented Mar. 19, 1918.
3 SHEETS—SHEET 1.

Inventor
Chas. S. Nichols

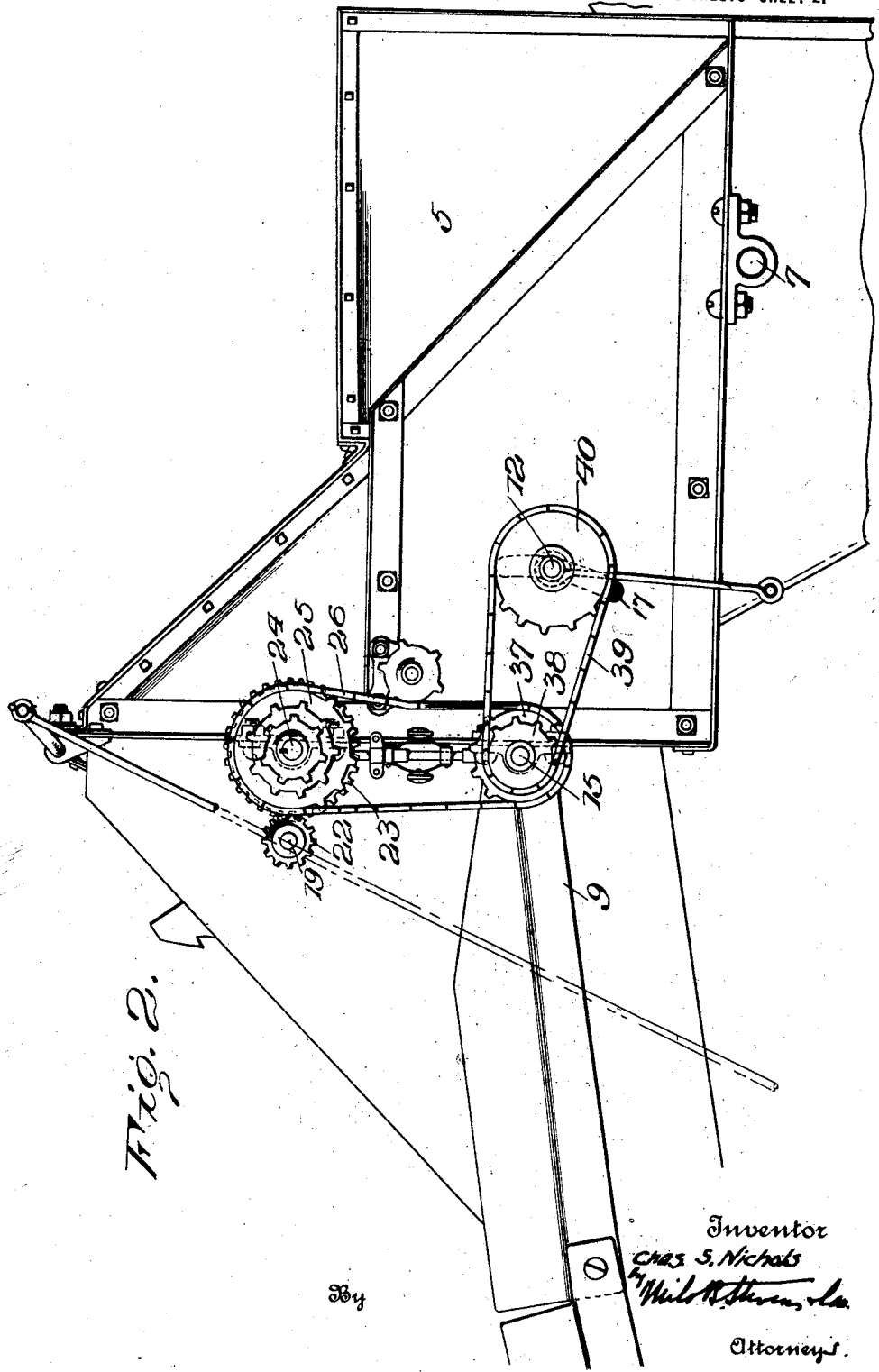

C. S. NICHOLS.
BAND CUTTER AND FEEDER FOR THRESHING MACHINES.
APPLICATION FILED JULY 2, 1917.

1,260,014.

Patented Mar. 19, 1918.
3 SHEETS—SHEET 3.

UNITED STATES PATENT OFFICE.

CHARLES S. NICHOLS, OF BROADWATER, NEBRASKA.

BAND-CUTTER AND FEEDER FOR THRESHING-MACHINES.

1,260,014.      Specification of Letters Patent.      Patented Mar. 19, 1918.

Application filed July 2, 1917. Serial No. 178,233.

*To all whom it may concern:*

Be it known that I, CHARLES S. NICHOLS, a citizen of the United States, residing at Broadwater, in the county of Morrill and State of Nebraska, have invented new and useful Improvements in Band-Cutters and Feeders for Threshing-Machines, of which the following is a specification.

This invention relates to mechanism for cutting the bands of the bundles of grain delivered to a threshing machine, and for feeding the grain to the threshing cylinder.

The invention has for its object to provide a mechanism of the kind stated which is simple in construction and highly efficient in operation, a uniform distribution and regular feed of the grain as it passes from the band cutters to the threshing cylinder, being obtained.

The object stated is attained by means of a novel combination and arrangement of parts to be hereinafter described and claimed, and in order that the same may be better understood, reference is had to the accompanying drawings forming a part of this specification.

In the drawings—

Fig. 2 is a side elevation of this portion of the machine showing certain driving means;

Fig. 3 is a front elevation of a retarder; and

Fig. 4 is a plan view thereof.

Figure 1:
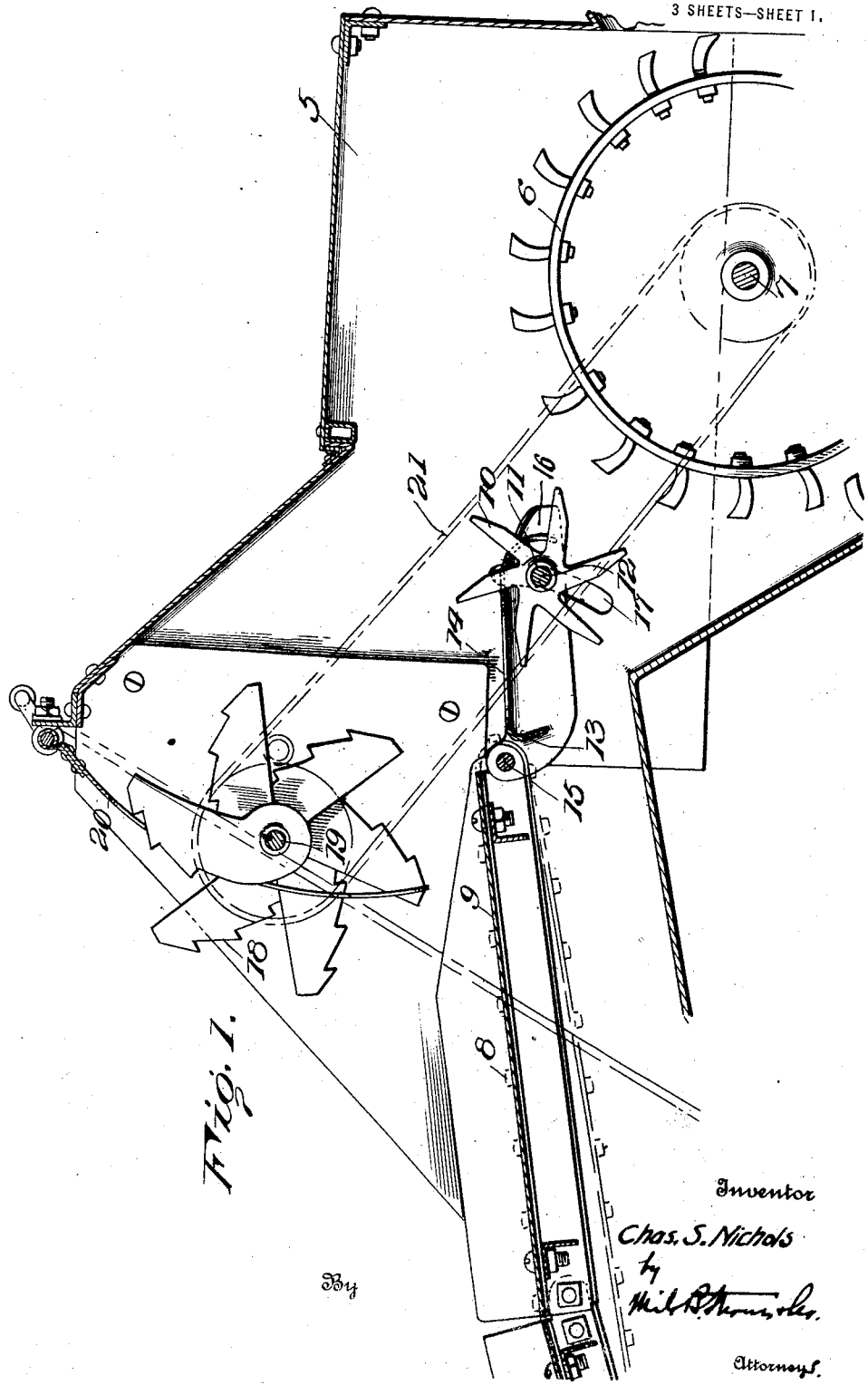
Figure 1 is a longitudinal section of a fragment of a threshing machine showing the application of the invention.

Referring specifically to the drawings, 5 denotes the forward end of the casing of a threshing machine, the same containing a threshing cylinder 6 constructed and operating in the usual manner, and carried by a shaft 7. The grain is fed into the casing by a conveyer 8 running over a feed table 9. Between the discharge end of the feed table and the threshing cylinder is located a rotary retarder composed of a series of blades 10 projecting radially from a hub 11 fixed on a shaft 12 extending across the casing 5. The shaft 12 carries a plurality of these retarder units, they being mounted in laterally spaced relation on the shaft.

Associated with the retarder is a comb for preventing entanglement of the grain therewith, and also for preventing the grain from wrapping around the retarder shaft 12. This comb comprises a plate 13 having a series of projecting teeth 14 between two adjacent ones of which a retarder unit works. The teeth are located above the shaft 12 and their outer ends are curved downward to terminate in front of the shaft 12. It will therefore be seen that the grain is kept away from the shaft 12 and is prevented from wrapping around the same. The comb plate is pivotally hung at its inner end on a transverse shaft 15, and at its ends it has forwardly extending arms 16 which are connected to the shaft 12, said arms having apertures through which the shaft loosely passes. The comb plate is therefore free to swing with the retarder shaft, the latter being movable up and down in slots 17 in the side walls of the casing 5 for a purpose well understood by those skilled in the art. The comb occupies the space between the discharging end of the conveyer 8 and the retarder, and extends forward from the end of the feed table 9, in view of which it effectually serves the purpose for which it is designed.

Above the discharge end of the feed table 9 is located a band cutter in the form of a series of blades 18 having a curved and serrated cutting edge, and mounted on a rotatable shaft 19. A comb 20 is also associated with the band cutter.

The shafts 7 and 19 are operatively connected by a belt or other gearing 21. On the shaft 19 is a pinion 22 which is in mesh with a spur gear 23 on a countershaft 24 carrying a set of different sized sprocket wheels 25 any one of which, according to the speed desired, is connected by a chain 26 to a sprocket wheel 37 on the shaft 15, the latter shaft being the one which drives the conveyer 8. The shaft 15 also carries a sprocket wheel 38 connected by a chain 39 to a sprocket wheel 40 on the retarder shaft 12 for driving the latter. The various other devices and appurtenances of the machine may all be arranged in the customary manner.

I claim.

In a threshing machine, a feeder, a threshing cylinder, a retarder between the cylinder and the discharge end of the feeder, a vertically movable shaft carrying the retarder, and a comb associated with the retarder and extending thereto from the discharge end of the feeder, said comb comprising a plate having a series of projecting teeth between which the retarder units work, said plate being pivotally hung at its inner end directly on the feeder and having forwardly extending arms which are connected to the retarder shaft.

In testimony whereof I affix my signature.

CHARLES S. NICHOLS.

Copies of this patent may be obtained for five cents each, by addressing the "Commissioner of Patents, Washington, D. C."